(12) United States Patent
Burke

(10) Patent No.: US 7,536,906 B2
(45) Date of Patent: May 26, 2009

(54) TELL-TALE FOR BOAT SAIL

(75) Inventor: John C. Burke, 324 Touraine Rd., Grosse Pointe Farms, MI (US) 48236

(73) Assignee: John C. Burke, Grosse Pointe Farms, MI (US)

( * ) Notice: Subject to any disclaimer, the term of this patent is extended or adjusted under 35 U.S.C. 154(b) by 0 days.

(21) Appl. No.: 11/454,957

(22) Filed: Jun. 19, 2006

(65) Prior Publication Data

US 2007/0289374 A1    Dec. 20, 2007

(51) Int. Cl.
     *G01P 13/00*    (2006.01)
(52) U.S. Cl. .................. 73/170.03; 73/170.06
(58) Field of Classification Search ............. 73/170.02, 73/170.03, 170.06
See application file for complete search history.

(56) References Cited

U.S. PATENT DOCUMENTS

| | | | | |
|---|---|---|---|---|
| 3,371,529 A | * | 3/1968 | Tillman ................... | 73/170.03 |
| 3,763,307 A | | 10/1973 | Wolf ........................ | 174/117 |
| 3,799,106 A | * | 3/1974 | Lamport .................. | 116/28 R |
| 4,481,505 A | * | 11/1984 | Thompson ................ | 340/601 |
| 4,886,007 A | * | 12/1989 | Wheeler ................... | 114/102.2 |
| 5,477,424 A | | 12/1995 | Mocha ..................... | 362/586 |
| 5,877,415 A | | 3/1999 | Kruse ...................... | 73/170.03 |
| 6,802,633 B1 | | 10/2004 | VandenBossche .......... | 362/477 |

FOREIGN PATENT DOCUMENTS

| | | |
|---|---|---|
| DE | 299 03 010 | 5/1999 |
| GB | 1 403 371 A | 8/1975 |
| WO | WO 03/042035 | 5/2003 |

* cited by examiner

*Primary Examiner*—Andre J Allen

(57) ABSTRACT

A new and improved tell-tale comprised of a flexible array of light emitting diodes (LED's) that is integrated into a fabric tell-tale strip. A port side tell-tale includes a flexible array of red color emitting LED's and a starboard side tell-tale includes a flexible array or green colored LED's. Electricity is conducted to the tell-tale strips by foil conductors that are embedded within adhesive backed plastic strips which adhere to the sail.

18 Claims, 2 Drawing Sheets

TELL-TALE FOR BOAT SAIL

FIELD OF THE INVENTION

The present invention relates to a tell-tale for indicating the airflow over a sailboat sail, and more particularly to a self-illuminating tell-tale.

BACKGROUND OF THE INVENTION

It is known in sail boats to attach a light weight strip of fabric to a sail boat sail to form a tell-tale that will flutter in the wind and thereby provide the crew with an indication of the airflow over the sail so that sail can be trimmed to maximize the performance of the boat. However, at night or in low light conditions these tell-tales are difficult to see. Therefore it is known to use a flashlight to view the tell-tale, or to mount a light source on the mast to shine on the tell-tale. Furthermore, U.S. Pat. No. 5,477,424 proposes fashioning a tell-tale of an optical fiber ribbon that is housed between transparent or translucent plastic straps and receives light from an LED communicating with the end of the optical fiber ribbon so that light emits along its length to make the tell-tale visible at night.

SUMMARY OF THE INVENTION

The present invention is a new and improved tell-tale comprised of a flexible array of light emitting diodes (LED's) that is integrated into a fabric tell-tale strip. Electricity is conducted to the tell-tale strips by foil conductors that are embedded within adhesive backed plastic strips which adhere to the sail. The LED's may be colored, for example, on a jib, a port side tell-tale may include a flexible array of red color emitting LED's and a starboard side tell-tale may include a flexible array or green colored LED's. A transparent window may be provided in the jib so that the crew can view both of the tell-tales from either side of the sail. The LED's on the main sail may be orange or any other color, as desired.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
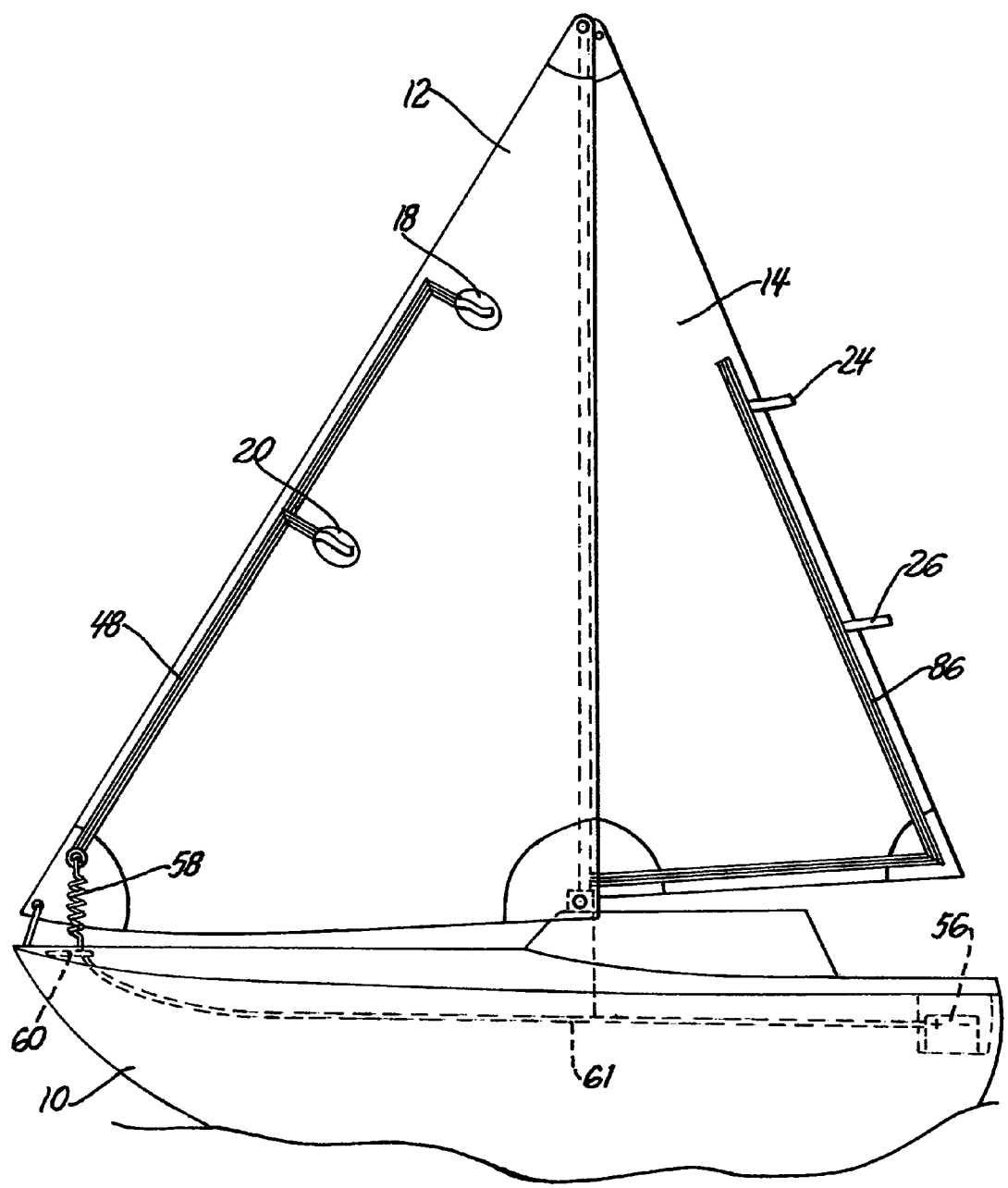
FIG. 1 is a side elevation view of a sail having tell-tales according to the present invention.

FIG. 1 shows a sail boat 10, having a mast that supports, a jib sail 12 and a main sail 14. Tell-tales 18 and 20 are mounted on the port side of the jib 12, adjacent the leading edge of the jib 12. The jib 12 also has other telltales, not shown in FIG. 1, that are mounted on the starboard side of the jib 12, directly opposite the tell tales 18 and 20. Tell-tales 24 and 26 are mounted on the main sail 14 adjacent its trailing edge.

Figure 2:
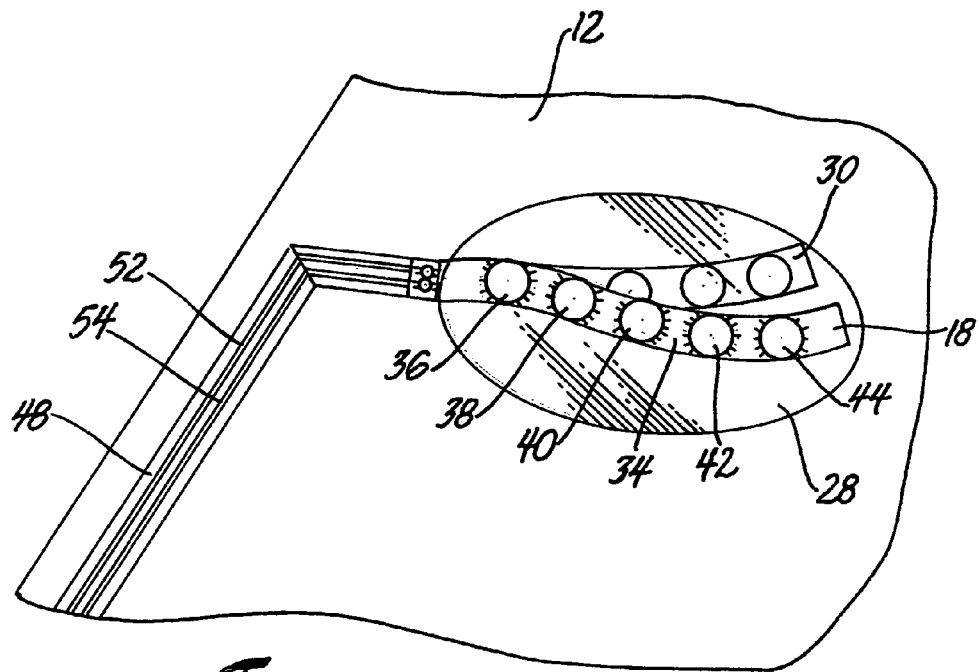
FIG. 2 is an enlarged fragmentary view of a portion of FIG. 1.
Figure 3:
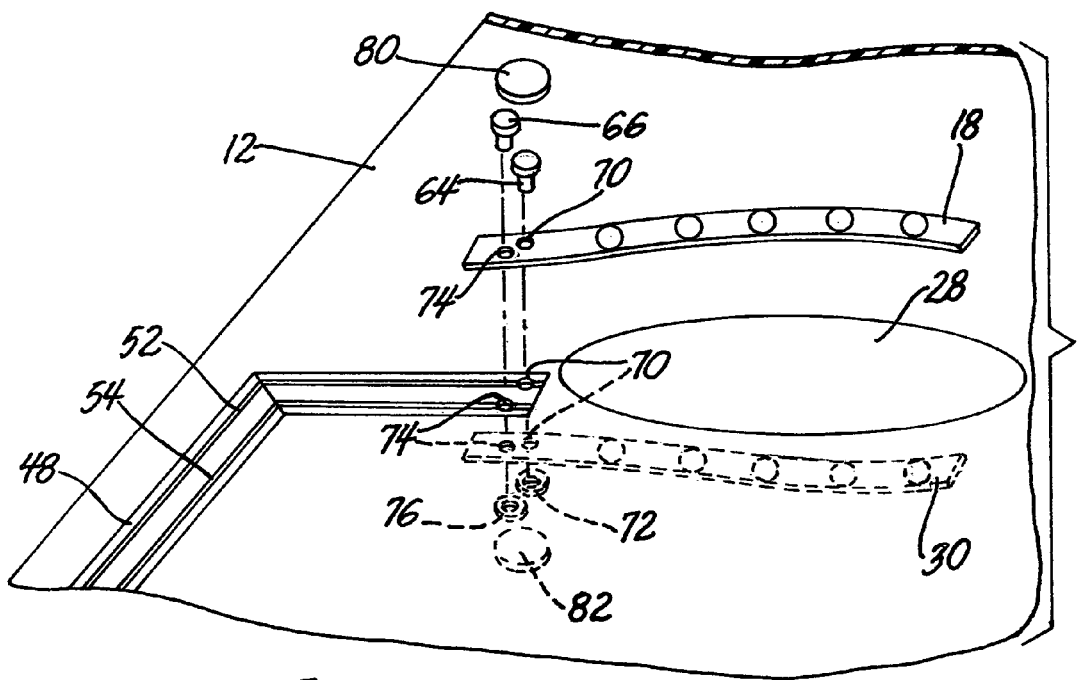
FIG. 3 is an exploded view corresponding to FIG. 2.

As best seen in FIGS. 2 and 3, the jib 12 has a transparent window 28 of clear plastic that is inset into the nylon, Dacron, polyester, mylar, or other fabric material of the jib 12 so that an observer on the port side of the boat 10 can see the tell-tale 18 mounted on the port side of the jib 12, and also see the corresponding tell-tale 30 that is mounted on the starboard side of the jib 12.

The tell-tale 18 is comprised of a waterproof fabric strip 34, such as nylon, that has a flexible array of light emitting diodes (LED's) integrated into the fabric. In particular, it is seen that the array includes LED's 36, 38, 40, 42, and 44 that are arrayed in a single row along the length of the fabric strip. The fabric strip 34, with the integrated LED's is available from Royal Philips Electronics, N.V., of the Netherlands as a "photonic textile". The LED's are miniature light sources, available in many colors, and the fabric material covering the LED's naturally diffuses light emitting from the LED's so that the visual effect is to provide a well lighted fabric material which nonetheless retains the soft look and feel of fabric.

Electricity is conducted to the tell-tale strips by foil conductors that are embedded within adhesive backed plastic strips which adhere to the jib 12. In particular, a main conductor 48 extends along the leading edge of the jib 12, and includes a copper or aluminum foil strip 52 and a foil strip 54 that run parallel with one another and are encapsulated within a polyester jacket having an acrylic adhesive coating one side thereof so that the main conductor 48 may be readily attached to the jib 12 by adhesive bonding. Conductor 48 is commercially available in clear, black, and white colors from Fuller Manufacturing, Inc, Burbank, Calif. 91506 and sold under the trade name Taperwire, and is available with either flat strip or round wire conductors.

As seen in FIG. 1, the lower end of the conductor 48 is connected to the boat's 12 volt electrical battery 56 by a coil wire 58 that extends to a plug 60 mounted on the deck of the sail boat 10, and a pair of wires 61. A switch is located where desired in the circuit.

Referring to FIG. 3, it is seen that a pair of rivets 64 and 66 are used to attach the tell-tales 18 and 30 to the opposite sides of the jib 12, and also electrically connect the tell-tales 18 and 30 to the conductor 48. In particular it is seen that a first hole 70 is provided through the tell-tale 18, the foil strip 52, the jib 12, and the tell-tale 30. The rivet 64 is installed through the holes 70 and a washer 72 is installed and the rivet 64 is peened. A second hole 74 is provided through the tell tale 18, the foil strip 54 and the tell-tale 30. The rivet 66 is installed through the holes 74 and a washer 76 is installed and the rivet 66 is peened. Thereafter, a weather proof seal 80 is adhesively secured over top the rivets 64 and 66 on the port side of the jib 12 and a weather proof seal 82 is adhesively secured over top the washers 72 and 76. It will be understood that the tell-tale 18 includes electrical conductors integrated therein that are engaged by the rivets 64 and 66 and conduct electrical current to the array of LED's 36, 38, 40, 42 and 44. Thus the rivets 64 and 66 act as electrical connectors and tell-tales 18 and 30 are simultaneously attached to the jib 12 and connected to the electrical conductor 48 and the boat electrical system.

If desired, the port side tell-tale 18 includes a flexible array of red color emitting LED's and the starboard side tell-tale 30 includes a flexible array of green colored LED's. Accordingly, the observer may readily distinguish between the port and starboard side tell-tales when observing from one side of the sail as enabled by the transparent window 28. During the day light hours the tell-tales will not be illuminated and will appear as conventional flexible fabric tell-tales.

Referring again to FIG. 1, it will be understood that the main sail tell-tales 24 and 26 are also comprised of a flexible array of LED's and are connected to the electrical system by a conductor 86 that is adhered to the main sail 14. If desired, the main sail tell-tales 24 and 26 are the color orange, or whatever other color is common or desired in the region where the boat 10 is sailed.

The foregoing description of the invention is merely exemplary in nature and, thus, variations thereof are intended to be within the scope of the invention. For example, the tell tales may have an array of LED's in any pattern or arrangement or number that provides the desired level of illumination. Thus depending upon the size and lighted intensity of the LED's, and the desired size of the tell-tales, the LED's may be arranged in an array that has a single row or double row of LED's. The LED's may be colored as desired by the boat owner to personalize the boat. If desired, the tell-tales 18 and 30 can be offset in height on the jib 10, and each will be connected to the conductor 48 by separate rivets. In addition, other style electrical connectors available in the industry may be employed as an alternative to the rivets shown in the drawings.

What is claimed is:

1. A tell-tale for a sail boat sail comprising:
  a strip of sail fabric material having integrated therein a flexible array of a plurality of light emitting diodes whereby the strip of fabric material is flexible and lightweight and retains the soft look and feel of fabric to be visible during the day light and to flutter in the air flowing around the sail, and energization of the array of a plurality of light emitting diodes illuminates the strip of fabric material by diffusing the light emitting from the plurality of light emitting diodes through the fabric material so as to be visible in low ambient light conditions.

2. The tell-tale of claim 1 in which conductors are adhesively secured to the sail to conduct electrical current to the strip of fabric material.

3. The tell tale of claim 1 in which the light emitting diodes emit the color red and the tell-tale is adapted for mounting on the port side of the sail.

4. The tell tale of claim 1 in which the light emitting diodes emit the color green is adapted for mounting on the starboard side of the sail.

5. The tell tale of claim 1 in which the light emitting diodes emit the color orange.

6. The tell-tale of claim 1 in which electrical circuit for selectively energizing the light emitting diodes comprises:
  a pair of electrical wires connected to an electrical source;
  a pair of metal foil conductors encased in plastic and adhesively secured to the sail to extend from the strip of fabric to the pair of electrical wires.

7. The tell tale of claim 6 in which the tell-tale is electrically connected to the one of the pair of metal foil conductors by a first rivet and electrically connected to the other of the pair of metal foil conductors by a second rivet.

8. The tell-tale of claim 7 in which the first and second rivets extend through the sail to both make the electrical connection and also attach the tell- tale to the sail.

9. The tell-tale of claim 1 in which a transparent window is provided in the sail so the strip of fabric and light emitting diodes are visible from either side of the sail.

10. A tell-tale for a sail boat sail comprising:
  a first strip of fabric material mounted on the port side of the sail and having integrated therein a flexible array of light emitting diodes whereby the strip of fabric material is flexible and lightweight to retains the soft look and feel of the fabric material to be visible during the day light and to flutter in the air flowing around the sail and energization of the light emitting diodes illuminates the strip of fabric material by diffusing the light emitting from the plurality of light emitting diodes so as to be visible in low ambient light conditions;
  and a second strip of fabric material mounted on the starboard side of the sail and having integrated therein a flexible array of light emitting diodes whereby the strip of fabric material is flexible and lightweight to retain the soft look and feel of the fabric material to be visible during the day light and to flutter in the air flowing around the sail and energization of the light emitting diodes illuminates the strip of fabric material by diffusing the light emitting from the plurality light emitting diodes so as to be visible in low ambient light conditions.

11. The tell-tale of claim 10 further comprising a patch of transparent material incorporated into that portion of the sail interposed between the first strip of fabric material and the second strip of fabric material so that both the first strip of fabric material and the second strip of fabric material can be simultaneously viewed from a vantage point on either side of the sail.

12. The tell-tale of claim 10 further comprising the port side light emitting diodes being red in color and the starboard side light emitting diodes being green in color.

13. The tell-tale of claim 10 in which electrical current for selectively energizing the plurality of light emitting diodes comprises:
  a pair of electrical wires connected to an electrical source;
  a pair of metal foil conductors encased in plastic and adhesively secured to one side of the sail to extend from one of the strips of fabric material to the pair of electrical wires;
  and an electrical connector extending through the sail from the one strip of fabric material to the other strip of fabric material so that the strips of fabric material on both sides of the sail are both connected to the electrical source.

14. A tell-tale for a sail boat sail comprising:
  a first strip of fabric material mounted on the port side of the sail and having integrated therein a flexible array of light emitting diodes whereby the strip of fabric material is flexible and lightweight to retains the soft look and feel of the fabric material to be visible during the day light and to flutter in the air flowing around the sail and energization of the light emitting diodes illuminates the strip of fabric material by diffusing the light emitting from the plurality of light emitting diodes so as to be visible in low ambient light conditions;
  and a second strip of fabric material mounted on the starboard side of the sail and having integrated therein a flexible array of light emitting diodes whereby the strip of fabric material is flexible and lightweight to retain the soft look and feel of the fabric material to be visible during the day light and to flutter in the air flowing around the sail and energization of the light emitting diodes illuminates the strip of fabric material by diffusing the light emitting from the plurality light emitting diodes so as to be visible in low ambient light conditions;
  a pair of electrical wires connected to an electrical source;
  a pair of metal foil conductors encased in plastic and adhesively secured to one side of the sail to extend from one of the strips of fabric material to the pair of electrical wires;

and an electrical connector extending through the sail from the one strip of fabric material to the other strip of fabric material so that the strips of fabric material on both sides of the sail are both connected to the electrical source; said electrical connector having a first rivet connected to one of the metal foil conductors and a second rivet connected to the other of the metal foil conductors and extending through the sail to the other side of the sail for connection to the other of the strips of fabric material.

15. A tell-tale for a sail boat sail comprising:

a strip of fabric material having soft look and feel and attached to the sail and having a free end to flutter in the wind;

a flexible array of a plurality of light emitting diodes integrated into the strip of fabric material so that the fabric material retains the soft look and feel to flutter in the wind;

an electrical conductor having a first conductor and a second conductor embedded within an adhesive coated plastic strip and secured to the sail and connected to a source of electrical current;

and a first rivet extending through the sail and the strip of fabric material and the first conductor to attach the strip of fabric material to the sail and also electrically connect the first conductor to the flexible array of the plurality of light emitting diodes, and a second rivet extending through the sail and the strip of fabric material and the second conductor to attach the strip of fabric to the sail and also electrically connect the second conductor to the flexible array of the plurality of light emitting diodes whereby energization of the emitting diodes causes the light emitting from the plurality of light emitting diodes to diffuse through the fabric material and thereby illuminate the strip of fabric material so as to be visible in low ambient light conditions.

16. The tell-tale of claim 15 in which the first conductor is a first foil strip and the second conductor is a second foil strip.

17. The tell tale of claim 15 in which the plurality of light emitting diodes emit a chosen color.

18. The tell-tale of claim 15 in which a transparent window is provided in the sail so the strip of fabric material and the light diffusing from the plurality of light emitting diodes are visible from either side of the sail.

* * * * *